United States Patent [19]
Collins

[11] 3,918,054
[45] Nov. 4, 1975

[54] TIME COMPRESSION SYSTEM ADDING NOISE TO ALLOW ONE BIT QUANTIZATION

[75] Inventor: John D. Collins, Burlington, Mass.

[73] Assignee: Raytheon Company, Lexington, Mass.

[22] Filed: Sept. 5, 1973

[21] Appl. No.: 394,592

Related U.S. Application Data

[63] Continuation of Ser. No. 174,221, Aug. 23, 1971, abandoned, which is a continuation of Ser. No. 787,504, Dec. 27, 1968, abandoned.

[52] U.S. Cl. .......................... 343/5 DP; 343/17.1 R
[51] Int. Cl. .......................... G01s 9/02; G01s 9/06
[58] Field of Search ............ 343/5 R, 5 DP, 17.1 R; 325/32, 35

[56] References Cited
UNITED STATES PATENTS

| | | | |
|---|---|---|---|
| 3,150,367 | 9/1964 | Harrington | 343/17.2 X |
| 3,177,489 | 4/1965 | Saltzberg | 343/113 X |
| 3,260,326 | 7/1966 | Webb | 181/.5 |
| 3,337,803 | 8/1967 | Costas et al. | 325/32 X |
| 3,337,870 | 8/1967 | Allen et al. | 325/62 UX |
| 3,478,169 | 11/1969 | Saito | 325/32 X |
| 3,517,313 | 6/1970 | Vasile | 325/32 |

*Primary Examiner*—Malcolm F. Hubler
*Attorney, Agent, or Firm*—Milton D. Bartlett; Joseph D. Pannone; Harold A. Murphy

[57] ABSTRACT

A time compression signal processor which adds noise in a signal-free region and samples at such a rate that the noise does not interfere with the signal region, comprising a filter, noise generator and summer for adding noise to the signal to be analyzed as a carrier therefor, sample-quantize means for sampling and making a polarity decision (1 bit quantization), time compression means for storing and speeding up polarity samples including a random access memory device and spectrum analyzer means for processing each resolution cell in sequence.

15 Claims, 15 Drawing Figures

$f_o$ I MS DRIVING PULSE
FIG. 6A

$f_o - 2088$ KC TIME RESPONSE
FIG. 6B

$f_o + 1044$ KC FILTER RESPONSE
FIG. 6C $f_o$ FILTER RESPONSE
FIG. 6D $f_o + 1044$ KC FILTER RESPONSE
FIG. 6E $f_o + 2088$ KC FILTER RESPONSE
FIG. 6F

FIG. 6G $f_o - 1044$ KC, $f_o$, $f_o + 1044$ KC
FREQUENCY

INVENTOR
JOHN D. COLLINS
BY Irving S. Rappaport
ATTORNEY

TIME COMPRESSION SYSTEM ADDING NOISE TO ALLOW ONE BIT QUANTIZATION

This is a continuation of application Ser. No. 174,221 filed Aug. 23, 1971; now abandoned, which is a continuation of Ser. No. 787,504 filed Dec. 27, 1968 (now abandoned).

Application Ser. No. 129,218, entitled Time Compression Signal Processor, filed Mar. 29, 1971 by John D. Collins as a continuation of application Ser. No. 787,506 filed Dec. 27, 1968 (now abandoned), now U.S. Pat. No. 3,786,504, and application Ser. No. 99,294, entitled Time Compression Signal Processor, filed Dec. 17, 1970 by John D. Collins as a continuation of application Ser. No. 787,314 filed Dec. 27, 1968 (now abandoned), now U.S. Pat. No. 3,774,201, both assigned to the same assignee as this application, are hereby incorporated by reference and made a part of this application.

BACKGROUND OF THE INVENTION

There is frequently a requirement for the simultaneous processing of signals from a number of channels, such as coherent radars and sonar systems with multiple antenna beams, range gates, velocity gates, etc. One prior art approach is to use an identical processor for each channel. In the radar case, the processor is generally a group of filters utilized to enhance the signal in a background of noise and clutter with narrow band filtering. If it is a wide-band system due to ranging modulation on the transmitter, a group of cross-correlation devices would replace the bank of filters. For example, velocity or frequency resolution is proportional to observation time, while range or time resolution is proportional to bandwidth. For the radar or sonar that requires high resolution in both velocity and range, a cross-correlator or range gate would be required for each antenna beam, and a bank of doppler filters is used for each range gate. Some systems in this class are: pulse doppler, FM/CW and pseudo random noise radar. The cross-correlator is a device whose output depends on time delay, while a doppler filter output is a function of the first derivative of time delay or range rate.

The total system requirement, or the number of independent bins, is the product of the number of antenna beams, range gates, and velocity filters that must be processed simultaneously. If a search mode is used in azimuth, elevation, range or velocity, the bins can be reduced by time sharing. The sensitivity is also reduced by the same factor since integrated signal energy, as compared to noise, is reduced that assuming that the target is illuminated continuously in time.

Time compression, a technique of parallel to serial conversion in the time domain, can be applied to any of these systems to reduce the number of processors in proportion to the compressor factor. Time compression can be used for spectrum analysis of multi-channel systems to reduce the number of filters and the analysis time. Some prior art methods utilize analog recording on magnetic tape, film, or drums. Generally speaking, time compression is accomplished by reading the stored data out at a faster rate than it was stored. Prior art time compression systems include the Deltic, which is a delay line time compressor, and a coherent memory filter. These devices can be used to perform a spectrum analysis of a single channel effectively without the need for a large number of parallel filter channels. However, these devices are not adapted for present coherent radars and multi-channel processor systems. One prior art time compression system uses a special transfluxor memory array as opposed to a standard random access memory as used by the present invention. In addition, this prior art system employs analog samples from a single signal source while the present invention utilizes digital samples from a plurality of signal sources.

A coherent radar system capable of tracking several targets at once, or alternately capable of searching for an unknown target at an unknown distance, contains a large number of channels, or receivers, each tuned to a different distance. As the radar acquires real or false targets, these receivers continually produce signatures—unusual or even unique frequency patterns that have to be analyzed to determine the various targets' velocity, acceleration, and other characteristics. The analysis, in general, must be performed as fast as the signals come in; recording the signatures for later analysis won't help if the targets are capable of destroying the radar.

Without time compression, the only way to keep track of all the targets in real time is to attach to each channel a complete processor consisting of a bank of narrowband filters and an associated computer. This approach is too expensive and entails too much equipment when more than a few channels are involved. Some radar systems have been designed around multiple processors, but all these networks are relatively large and complex.

If a system were just a single channel, but many range or velocity bins were to be analyzed, and the requirement was to use only one gate, the time compressor would record the signal and play it into the gate many times faster than real time, such that every desired bin is examined by the gate in sequence. While the signal is being read out of the storage medium at this faster rate on a continuous basis, the input is also continuously recorded to prevent loss of signal energy. The required compression ratio is equal to the number of separate bins that must be examined in sequence if a single gate is time shared. If two or more gates are used, the compression ratio can be reduced in proportion.

A more common system solution is the case where there are, for example, M input channels and P gates required for each channel. The product MP might typically be many thousands, and time compression by this factor to allow a single rate is usually not practical since the signal bandwidth is also increased by the compression factor. Compression by M the number of channels is usually a good choice since a single bank of P gates can be time shared among M channels. Another reason for this particular choice is that the signals stored in the memory for each channel need be used only once and discarded. For example, if P/2 filters were used, only half the signal range or, in effect, half a channel could be examined at a time required the stored signal from that channel to be placed back in the memory for a second processing for the other half of the signal range. In memories that are destructive readout, or erase before record, there is a loss in speed of operation by a factor of two.

With analog memory, the signals are recorded continuously in time and all levels of amplitude are retained within the degree of fidelity of the device. This is an inefficient way of using a memory, since sampling theory allows signals to be represented by instantaneous samples (as narrow in time as you please) taken at discrete times to represent the signal with sufficient quality for most practical purposes. This allows the samples to be stacked closer together than they originally existed. The practical limit is bandwidth, since the narrower the sample, or pulse, the greater the bandwidth.

Another advantage of sampling is that it allows many operations to be interlaced in time and, yet, have, in effect, many simultaneous operations with the same memory. If the memory is random access, the samples can be rearranged in any fashion desired within practical limits of the device.

Digital computer technology has developed, and is still developing, random access memory devices that are capable of high-speed operation, allowing time compression by closely stacking samples or a rearrangement of the order from which they were originally recorded. Magnetic cores in a three-dimensional matrix is just one example of a random access device that is economical and reliable because of extensive development and usage. It also has the advantage of high-speed and all-electronic operation.

Although analog samples can be stored in some types of memories, a more reliable approach is binary or two-level memory, since far greater manufacturing and environmental tolerances are possible in order to determine one of two levels rather than a range of levels. Conventional analog-to-digital conversion techniques can be used to convert the samples to a group of N binary levels. The number of permissible levels without interpolation is $2^N$ where N is the number of bits (0 or 1) per sample. Binary memory requires the use of N times as many memory elements as analog memory in addition to an analog-to-digital converter and a digital-to-analog converter at the output to reconstruct the analog sample.

If the signals are narrow band in comparison with noise, clutter, or random signals, and are small in amplitude as compared to the noise, clutter and other wide-band random signals, a special form of zero crossing limiting occurs when only polarity samples are stored such that the signal information is retained as if analog samples were stored, except for a small loss in signal-to-noise and clutter ratio.

This special case is useful in radar and sonar systems where signals are, in effect, buried in relatively wideband noise and clutter. A further advantage is that the noise and clutter voltage is held constant independent of the gain of devices prior to the time compression sampler, allowing a constant false alarm rate (CFAR) to be obtained with a fixed voltage threshold at the detector.

A spectrum analyzer can be constructed by adding noise purposely in a signal free region such that limiting with polarity samples (1 bit quantization) occurs on the noise and the signals in the noise-free region are retained linearily. In this way, a spectrum analyzer can be produced using a small number of filters time shared with polarity samples stored in the memory device by virtue of limiting on the added noise. The noise would be generally added in a frequency region higher than the signals of interest such that harmonics of the noise would not be introduced in the signal region. The sampling rate must be chosen high enough to prevent folding of the noise into the signal region. In order to keep the added noise frequency region small compared to the signal region, a relatively large noise amplitude would be used. One bit quantization has an advantage over higher bit quantization since N times less bits must be stored and processed.

An analogous digital approach to analog time compression as described in the present invention is to sample, quantize and store the analog signals followed by the inverse process. Time compression is accomplished by making the readout rate greater than the sampling rate. There are X identical input channels and Y identical filters. Each input is sampled in parallel during the sampling time and coded with PCM. Each gate is a sample-hold circuit. The sample taken is quantized with the A-D (analog-digital) converter and stored. Next a sample is taken of the adjacent channel and it is stored, followed by the next channel, etc. The sampling is done at a rate equal to at least twice the channel bandwidth. Only a single A-D converter is usually required since its operating speed is so much greater than the required sampling rate. In other words, the bit rate must be high enough to code all channels during one sample period such that only one channel is being sampled at a time, but each is sampled at a rate equal to at least twice the bandwidth. The sample time is determined by the desired predetection bandwidth.

The memory accepts one sample signal from each of several radar channels in turn. Simultaneously or intermittently with sampling of the channels, the stored samples from the first channel are read out in a continuous stream, then all the samples from the second, and so on. Thus, samples taken at, for example, milliseconds are read out in microseconds and appear to have been compressed in time. A digital-analog converter is used to convert the stored digital data to a serial analog signal. The information is then broken down into frequency components by a filter bank and analyzed by a computer to determine the range and velocity of various targets. This block readout, channel by channel, enables one filter bank to work on a time-shared basis. And because time compression raises the audio signal frequencies by a large factor, they can be analyzed by smaller and less expensive components.

The time compression signal processor of the present invention is characterized by the following features and advantages as well as others: 1. A central high-speed random access memory is used for time compression and other functions on a time-shared basis. 2. The program used permits more flexible and efficient operation than other techniques for time compression. 3. Either intermittent or continuous real-time processing can be accomplished. 4. Time compression permits many channels to be processed simultaneously with a single processor. 5. The system operates on a one bit quantization level. 6. Since a random access, core memory is used for time compression, storage and time can be made available for other functions such as digital integration, bright display, etc. 7. Digital integration using memory words on a random access basis has been instrumented. Integration is only performed when the first threshold has been exceeded. 8. Automatic target tracking is accomplished by updating the address of the target alarms as the position of the target changes with time. 9. A random access raster is contained in the memory for temporary or permanent storage. It is read out to remote indicators at a high rate to produce a bright, flickerless pattern. 10. A linear spectrum analyzer has one bit operation by adding noise in the signal-free region such that the sampling is controlled mainly by the added noise.

SUMMARY OF THE INVENTION

The above advantages, objects and features of the present invention, as well as others, are achieved by providing a time compression system adding noise to allow one bit quantization, the system comprising: a noise generator; a filter for filtering the generated noise; a summer for adding the filtered noise to the signals to be analyzed as a carrier therefore; sample-quantize means for sampling the signal at such a rate that the noise does not interfere with the signal region and for making a polarity decision; time compression means for storing and speeding up polarity samples including a memory device; and spectrum analyzing means for processing the time compressed signals in sequence. The memory with the associated timing circuitry is conventional and may be, for example, of the type disclosed in Chapter 22, pages 397-410, of the textbook "Digital Computer Principles", published by the McGraw-Hill Book Company, Inc. in 1962, Library of Congress Catalog Card Number 62-13207. The spectrum analyzing means may be, for example, a conventional bank of crystal filters referred to in greater detail in the publication entitled "Putting the squeeze on radar signals" in Electronics Magazine of Jan. 22, 1968, pages 86-94.

DESCRIPTION OF THE PREFERRED EMBODIMENTS

Figures 1, 3:
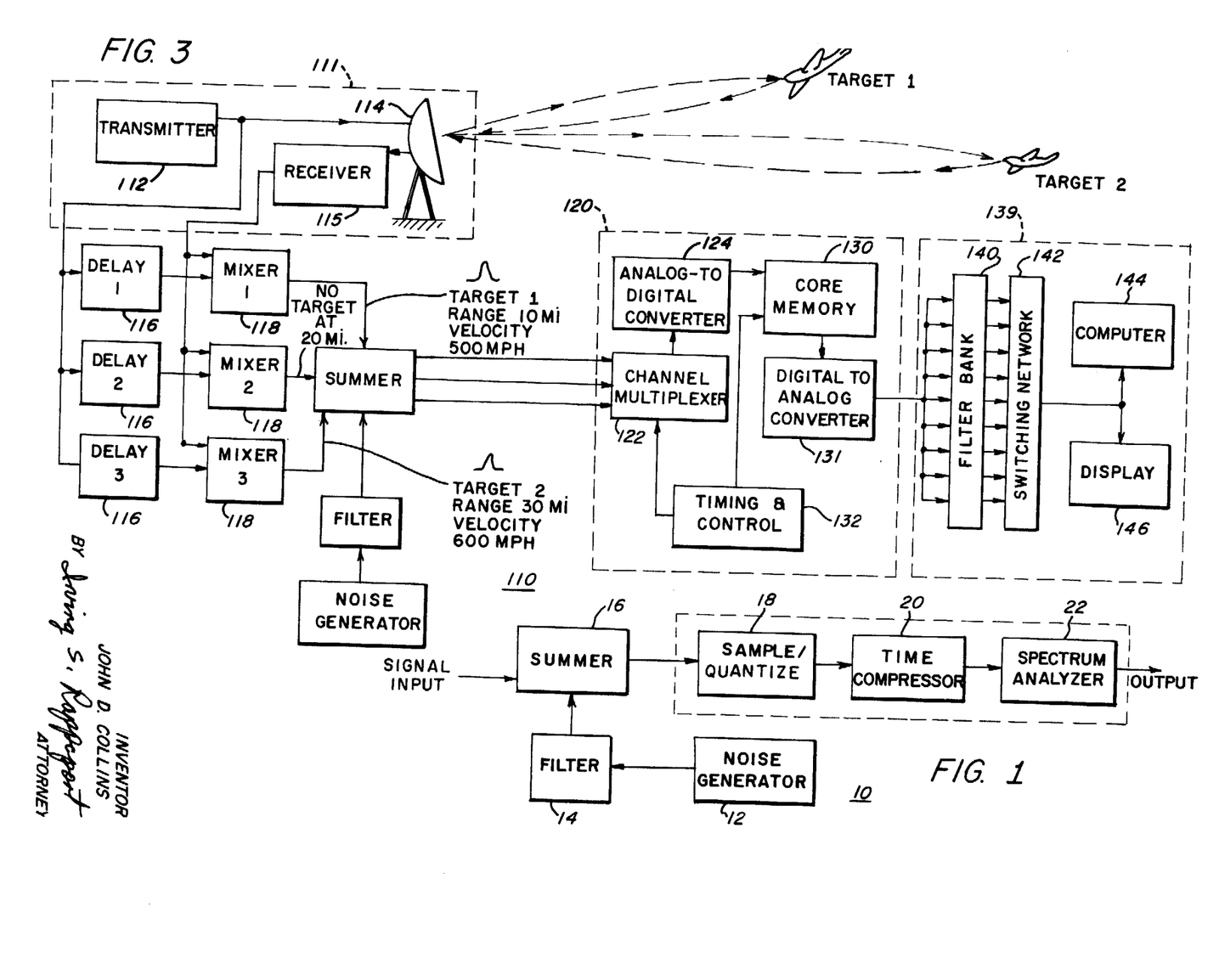
FIG. 1 is a block diagram embodying the time compression system of the present invention.
FIG. 3 illustrates a more detailed block diagram of the invention in FIG. 1.

FIG. 1 shows a time compression system 10 which includes one bit spectrum analysis that permits the construction of a linear analyzer. That is, the output is proportional to the input signal and in the presence of more than one input simultaneously or a complex input there are no significant harmonics, cross-modulation products or other frequencies introduced when only polarity samples are processed.

The method is to add noise in a signal-free region and sample at such a rate that the noise does not interfere or fold into the signal region. A noise generator 12 generates noise which is applied to a filter 14. The output signal and the filtered noise are combined in a summer 16 which may be, for example, a conventional adding circuit. The output from the summer is fed to sample and quantize circuitry 18. A time compressor 20 stores and speeds up the polarity samples from the sample and quantize circuitry 18 (two levels, one for positive signals and another for negative signals at the time of sampling). The noise generator 12, filter 14 and summer 16 add to the signal to the analyzed sufficient noise, in the proper bandwidth to allow the noise to act in effect as a carrier for the signal on a non-interference basis. The sample portion of circuitry 18 is a switch that closes at the sample rate for a short time compared to the period of the highest frequency and the quantizer portion of circuitry 18 makes a decision on the polarity of the signal; for example, logical 1 if positive and logical 0 if negative. The time compressor 20 is a memory capable of loading (writing in) the 1 bit polarity samples at the sample rate continuously and simultaneously unloading (reading out) the samples in a shorter period of time (the compression factor) by means of a time interlaced program. The signals stored are read out repeatedly enough times to allow each resolution cell of a spectrum analyzer 22 to be processed in sequence.

A key feature of the system is the added noise such that limiting occurs on the added noise that is made higher in amplitude than the signal in a different bandwidth usually higher in frequency. The bandwidth of the added noise would generally occupy a smaller bandwidth than the signal bandwidth to conserve on sample rate. The sample rate is greater than the sum of the signal and the additive noise bandwidth by a sampling factor chosen from practical sampling considerations. The loss of approximately 1 db due to limiting is eliminated with this method of spectrum analysis since the limiting occurs on the added noise rather than that associated with the targets of interest. For the case of a general-purpose laboratory spectrum analyzer no noise would be associated with the signal. The dynamic range is limited for high levels by the amount of additive noise as compared to the signal level and on the lower end by the minimum level that depends on practical design considerations. There is no theoretical limit to the minimum signal that can be processed or analyzed linearly.

At first glance, 1-bit quantization would seem very ineffective, as it can indicate only positive or negative, present or absent or some other binary condition. But signal amplitude is secondary in radar processing; the most important consideration is the way in which signals shift from filter to filter to indicate a target's speed, or from channel to channel to indicate changes in the target's distance from the receiver. Also, the noise usually present in radar signals has to be screened out.

Figure 2A:
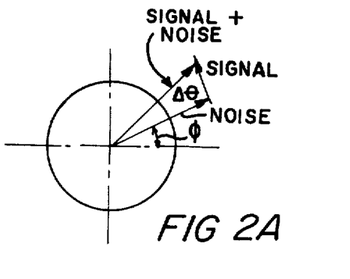
FIG. 2A-2C shows a graphical representation of the principle of operation of the present invention.
Figure 2B:
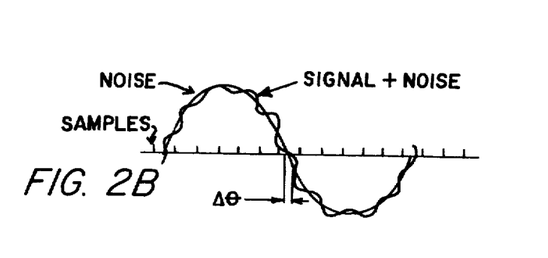
Figure 2C:
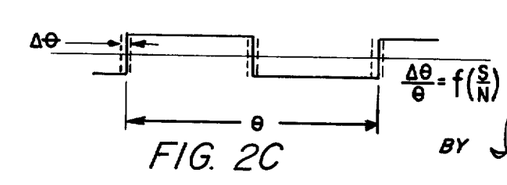

Signal-to-noise ratio is only slightly affected by the number of bits in signal quantization, as seen in the vector diagram in FIG. 2. Here a small signal vector at one frequency has been added to a large noise vector at some fundamental frequency. Because the frequencies are different, the vector representing the signal rotates about the tip of the noise vector as the noise vector rotates about the origin. Because the noise vector has a larger magnitude, the resultant rotates about the origin at a varying angular rate. The result, in this simplified case, is a noise vector phase-modulated by the signal.

The same situation is shown in the amplitude-versus-time plot just below the vector diagram. The large sine wave is the noise voltage, and the signal is superimposed on it. The result of sampling this phase-modulated signal with 1-bit quantizing is a square wave as shown with some uncertainty as to the zero-crossing points. The ratio of the width of this zone of uncertainty to the period of the square wave depends on the signal-to-noise ratio, not on the amplitude of either the signal or the noise. It has been experimentally verified that the spectrum of the reconstructed waveform with 1-bit and 6-bit quantizing shows that little or not useful information is lost by quantizing the signal with 1 bit. If the memory has been designed to make the best use of 1-bit quantizing, a single 6-bit word could have stored six samples instead of one. Other things being equal, a much higher compression ratio is then possible.

Time Compression Signal Processor

FIG. 3 shows a more detailed time compression signal processing system 110 of that shown in FIG. 1 utilized in conjunction with a coherent radar system, shown in dotted block 111, capable of tracking several targets at once, or alternately capable of searching for an unknown target at an unknown distance. For purposes of explanation, the radar system shown in dotted block 111 contains three channels 1, 2 and 3, but a larger number of channels may be employed. Each of the channels is tuned to a different distance and, as the radar system 111 acquires real or false targets, these channels continuously produce signatures in the form of unusual or even unique frequency patterns which must be analyzed to determine the velocity, acceleration, and other characteristics of the various targets. In general, the analysis must be performed as quickly as the signals are received, since recordation of the signatures for later analysis will not be beneficial if the targets are capable of destroying the radar system.

One input for the time compression signal processing system 110 comes from the coherent radar system 111 including a transmitter 112 and a transmitting/receiving antenna 114 which sends out a signal and receives an echo out of phase with the transmitted wave on a receiver 115. The system in FIG. 3 shows targets 1 and 2 at different distances from the transmitter 112 and the dotted lines and arrows indicate the path of the transmitted signals and the received echo signals. For all but very short ranges, the phase differences between the transmitted signal and the received echo signal is more than one wave length. A non-coherent radar is sensitive to amplitude only, not phase.

The transmitted signal from the transmitter 112 passes through one or more delay units 116 in parallel with the transmitting antenna 114. Each delay unit 116 shown for each of the channels 1, 2 and 3 inserts a time interval equivalent to an integral number of wave lengths, and the phase difference is measured between the echo signal and the delayed transmitter signal. The amount of delay then yields a gross indication of the target's distance and the phase difference provides a more accurate indication of the target's distance. Each delay unit 116 corresponds to a large increment of range or distance and each delay unit 116 and its associated circuitry including a mixer 118 comprise a separate radar channel. Each of the mixers 118 has as an input the delayed transmitted signal from its corresponding delay unit 116 and the received echo signal from the receiver 115. The outputs from each of the mixers 118 are fed to the summer 16 which also has as its input the noise generated by generator 12 and passed through filter 14. The outputs from the summer 16 are applied to time compression circuitry 120.

As a target moves toward or away from the radar system 111, the phase difference keeps changing. As peaks in the received signal successfully coincide with peaks and valleys in the transmitted signal, the phase difference itself acquires peaks and valleys, creating a difference frequency. The radar signals themselves are measured in gigahertz and the difference frequency usually in kilohertz. When the radar system 111 remains locked onto a single target, only one difference frequency is of interest and variation in this frequency corresponds to variations in the target's velocity. However, when several targets are in the radar beam, or when the radar searches for an unknown target, the system 111 keeps track of difference frequencies for each range. As an example, if the radar system has a range of 100 miles and a resolution of 1 mile, it must have 100 different channels. One channel looks for difference frequencies from 1 mile away, another channel for targets 2 miles away, and another for 3 miles, etc.

The outputs from each of the mixers 118 are applied in parallel to time compression circuitry shown in dotted block 120. The technique of time compression by a factor of the number of input channels can be demonstrated with the aid of FIG. 4. Only three channels are shown, but the technique may easily be extended to M channels with a compression factor of M. Only the sample points are shown for each of the channels, and the original and reconstructed wave forms for clarity but either analog or N bit quantization could be used. The samples are taken on a continuous basis from each channel in succession at a rate somewhat greater than twice the bandwidth of the individual channels. For example, all channels would have the same bandwidth, or at least the sampling is based on the channel with the greatest bandwidth, although there is a certain amount of flexibility in using different sampling rates for different input channels in integral multiples.

The time compression circuitry 120 includes a channel multiplexer 122 which receives the signals from each of the radar channels. The multiplexer 122 samples the signals from each of the channels rapidly in succession and applies the signals to an analog-to-digital converter 124. Since radar echoes are analog signals, they must be converted to digital form to be stored in the memory 130 unless the input signals are already in digital form, and then converted back to analog form in digital-to-analog converter 131 when being readout for analysis unless the filter bank 140 employs digital techniques such as a Fast Fourier Transform processor or digital filters. Although a particular time compression scheme is described here, any type of time compression system could be utilized with the present invention. A random access memory 130, which for purposes of discussion of the embodiment of the invention in FIG. 3 is a three-dimensional random access core memory, is coupled to the converter 124 and 131. Timing and control circuitry 132 is coupled between the memory 130 and the multiplexer 122.

The time compression circuitry 120 as shown in FIG. 3 fills the core memory 130 with samples from the various channels and simultaneously and interleaved therewith the samples are read out to a filter bank 140 channel by channel. The output signals from the time compression circuitry 120 are applied to a spectrum analyzer 139 which includes the filter bank 140, a switching network 142 to which the filter bank 140 outputs are applied, a computer 144 and a display 146. The size of the memory 130 is determined by the number of channels, M, the channel sample rate SB, and the amount of time, T, the computer 144 requires to process all the data in one channel. Thus, SBT samples are taken from each channel with each cycle of processing and the capacity of the memory 130 must be at least MSBT samples.

The most difficult part of using the compression techniques in a radar system is the discovery of an addressing scheme that allows the economical use of the storage at an adequate speed. The operation of a core time compression system utilized in the embodiment of the invention shown in FIG. 3 depends on the ability of the computer 144 to process the data in the memory 130 at a speed considerably faster than the data's arrival rate. Therefore, the computer 144 has a speed which is M times the data rate so that the computer 144 can analyze M channels without losing any data.

The simple three channel system shown in FIG. 3 illustrates the principle of time compression as applied in the present invention. The channel multiplexer 122 connects channel 1 to the core memory 130 through the analog-to-digital converter 124. The time compression circuitry 120 takes one sample from channel 1, converts it to digital form in converter 124 and then stores it in core memory 130. Then a sample is taken from channel 2, it is converted in converter 124 and stored in memory 130. This process is then repeated for channel 3. After the first sample from channel 3 has been stored, the second sample from channel 1 is taken. The sampling rate of each individual channel is at least twice the highest frequency of the signal in that channel or otherwise, the reconstruction signal might contain spurious frequencies and thus not truly represent the original signal. As the memory 130 collects many samples from each channel, simultaneously therewith, the information from channel 1 is converted back to analog form by converter 131 and is then applied to the filter bank 140 of spectrum analyzer 139. Samples from channels 2 and 3 are similarly analyzed and computer 144 determines the position and speed of the target from the output of the filter bank 140. The readout is much faster than the readin, the ratio of readout rate to readin being a multiplying factor that adjusts the analysis to compensate for this speed change.

Memory

Figure 4:
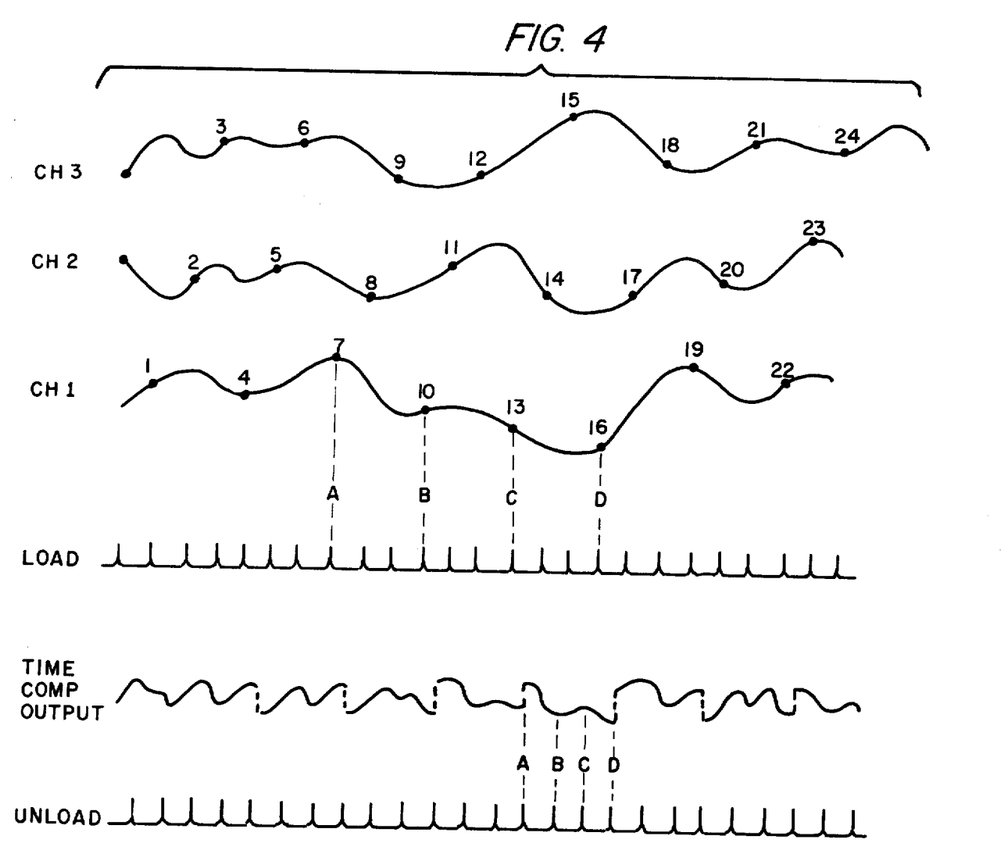
FIG. 4 shows waveforms illustrating the technique of time compression.

Again, considering FIG. 4, the samples are loaded or placed in the memory 130 at an appropriate location such that they can be later retreived in order from a given channel. The samples A, B, C and D from channel 1 were readout of the memory at a three times faster rate with the unload signal. The load and unload commands derived from timing and control circuitry 132 are time interlaced such that the memory sample rate must be at least twice the load and unload rate. If the memory 130 had excess capability other functions could be interlaced in time. Generally, the samples loaded and unloaded are evenly spaced and continuous for the operation. If it was desired to time compress by a factor of 2 times the number of channels, the unload rate would simply double and each couple of samples A, B, C and D would be fed back to the memory 130 and readout again. Compression by less than the number of channels can be accomplished by having more than one output. In this way the memory can unload more than one sample simultaneously. This flexibility is useful in systems where the compression ratio becomes higher than is practical and desirable. If the memory load rate is also higher than desired, more than one sample can be introduced in parallel in a similar fashion to reduce the memory load rate.

In understanding the present invention it should be shown how a memory with a geometry in the form of a plane or rectangle can be used for time compression. Other geometrys such as lines, cylinders, disks, etc., are also useful, the limitation of the memory being the speed and method of access. Random access of a memory is defined as the ability to load or unload a sample at any given location or address in a given period of time. As an example of a time compressor with a random access rectangular memory matrix, refer to FIG. 5. This could be an array of magnetic cores so commonly used in computer systems, but it should be noted that any random access memory can be used for time compression.

Figure 5:
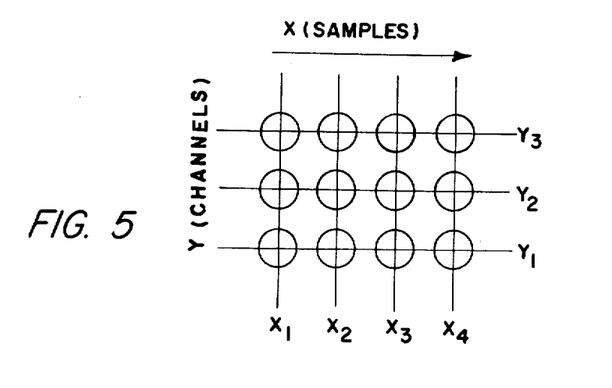
FIG. 5 shows a random access rectangular memory matrix.

In FIG. 5, there are 12 unique addresses: $X_1 Y_1$, $X_1 Y_2$, etc. The time compression as shown in FIG. 4 can be accomplished with the matrix of FIG. 5 by loading in the Y direction, bottom to top, and left to right in sequence and unloading from left to right, bottom to top, in the X direction such that sample 1 from channel 1 is placed in $X_1 Y_1$ and sample 1 from channel 2 is placed in $X_2 Y_1$; sample 1 from channel 3 in $X_1 Y_3$, and sample 2 from channel 1 in $X_2 Y_1$; sample 2 from channel 2 is placed in $X_2 Y_2$, etc. Unloading is done at right angles, or orthogonal to loading, in order to place all the samples in a given channel in sequence whereas loading was done on a channel-to-channel basis. Therefore, to unload samples 1, 2 3 and 4 from channel 2, etc., and repeating channel 1 after channel 3, etc., it is necessary to unload $X_1Y_1$, $X_2Y_1$, $X_3Y_1$, $X_4Y_1$, $X_1Y_2$, $X_2Y_2$, etc.

Random access addressing allows loading in one direction and unloading in the opposite direction, in addition to other advantates to be discussed subsequently. The various parameters of time compression are:

M — Number of input channels
B — Bandwidth of each channel
S — Sample factor
P — Number of bins per channel
T — Processing time
N — The number of bits taken for each sample by the analog-to-digital converter.

The processing time T is reduced by the compression factor M in the example. The memory capacity is:

$$\text{Memory Capacity} = SBMT \quad (1)$$

since samples are taken at a rate SB from M channels for T seconds. The memory rate is:

$$\text{Memory Rate} = 2SBM \quad (2)$$

since the memory must be completely loaded and unloaded of its capacity each T second.

In the example, the memory capacity was 12. Typical systems might require capacities in the tens, hundreds of thousands, or even millions. The length Y is equal to the number of channels and X is equal to the number of samples per channel. With a change in the addressing program, more than one line could be assigned to each channel, reducing the length of the X or Y at the expense of the other. A memory such as a core memory is word addressed, that is, only a single word can be either loaded or unloaded at a time. The rate is held to practical limits.

A data rate problem can exist for two distinct reasons. First, the input samples may exist at a rate greater than the memory load rate. Second, the unload word rate may not be fast enough to allow the desired compression factor. The first situation (sample rate greater than memory load word rate) can be improved by loading more than one sample at a time. The sample rate can be greater than the word rate of the memory by factors of the number of samples per word. The second problem (memory unloaded word rate not great enough for the desired compression) can be eliminated by programming the memory with more than one sample per word. The word is unloaded at the memory word rate into a shift register that allows a parallel to serial conversion and a signal speed up equal to the number of samples per word.

Ten Channel Time Compression System

One core time compression system employing the present invention which has been built has 10 channels (not shown), corresponding to the radar systems' ability to detect targets at 10 different distances. Within each channel, the band of detectable frequencies ranges from 200 to 900 hertz, corresponding to the velocity limits of the targets picked up. Each channel is sampled at a 2-kilohertz rate. An adequate sampling rate would be 1.8 khz-twice the highest signal frequency of 900-hz but a 2-khz rate offers a margin of safety. After each sample is converted into digital form, it's stored in a memory location corresponding to the sampled channel. The samples for all 10 channels come from a 20-khz oscillator, so that each sample is wide enough — 50 $\mu$sec to allow plenty of time for the conversion process and storage cycle to continue.

The compressor samples the channels for 300 msec, collecting 600 sample words from each channel. The MSBT product is (10) (2.22) (900) (0.3) = 6,000 meaning that the memory must be capable of holding 6,000 samples. The rate at which the stored information is transferred from the channels to the filter bank and thence to the computer is 1 msec per channel, so that the compression factor is 300 to 1. Because of this speeding up, the output frequency band-60 to 270 khz-appears to be 300 times as high as it really is.

Aside from this factor of 300, the 1 msec signal from each individual channel is a stepwise approximation of the original analog input. Added to this compressed signal is a 5 Mhz carrier frequency to permit the use of standard crystal filters instead of the much larger and more expensive kilohertz-band filters. Thus, the actual frequency band analyzed by the filter bank is 5,060 to 5,270 khz. Difference frequencies — 4,730 to 4,940 khz—duplicating the information in the sum band are also present, outside the filter range.

Filter Bank

Because the signal from a specific channel can be quite complex-reflecting several targets traveling at different speeds or a single target moving erratically — the difference frequency must be broken down into its various components. This is conveniently done by a bank of narrowband filters, each of which isolates a single component frequency from the received signal.

Suppose an individual channel picks up targets moving at speeds between 100 and 500 miles per hour at a range of 50 miles. The signal from this channel could be analyzed by a bank of, for example, 40 filters, one of which would produce an output if the difference frequency indicated the presence of a target traveling at between 100 and 110 miles per hour; another indicating a target velocity of 110 to 120; the next, 120 to 130, and so on. The 40th filter's output would correspond to a speed between 490 and 500 mph.

These filters by themselves cannot indicate whether a target is moving toward or away from the radar antenna, but the doppler effect can. The echo from an approaching target will be at a higher frequency than the transmitted signal, and at a lower frequency if the target is moving away. This effect, together with the output of the filter bank, gives complete information about the target's radial motion.

A target moving twoard the receiver at a constant velocity generates a constant difference frequency that produces a steady output from one filter in a single channel. As the target comes closer to the receiver, the signal switches from channel to channel, producing outputs from corresponding filters in successive channels.

Most targets, however, don't move at constant speeds. They may, for instance, have transverse components; the radar can track only the radial velocity component. Even if the target is moving along an oblique line, the radial component changes only gradually in proportion to the cosine of the angle between the target's path and the line of sight. Or the target may be tumbling or rolling; as parts of it move at different velocities, a frequency modulation is set up in the difference signal.

As the target's velocity changes, its frequency—as produced by the radar changes. This frequency variation plotted against time yields the target's signature, by which, for example, various satellites in orbit around the earth can be identified.

In the 10 channel core time compression system described above, the compressed band is analyzed by a bank of 200 bandpass filters with center frequencies equally spaced at 1.05 khz intervals and output-versus-frequency curves resembling the Gaussian, or bell-shaped, distribution. Filters with more nearly rectangular characteristic curves would be better suited for straightforward spectrum analysis, but part of the problem in a radar system is extracting the signal from a noise background; Gaussian filters were better at extracting the signal.

The center frequency of each filter corresponds to a particular velocity of a target, and the filter with the maximum output therefore indicates the velocity. To assure that the outputs from the filter bank are as large as possible, even for frequencies between the center levels, the filter bandpass characteristics overlap. The bandwidth of each filter-measured between frequencies where the output is 3 decibels below that of the center frequency — is greater than the spacing between the center frequencies. Thus, the depth of the valley between adjacent peaks is only 2 db and no frequency is attenuated more than 2 db.

Figure 6A:
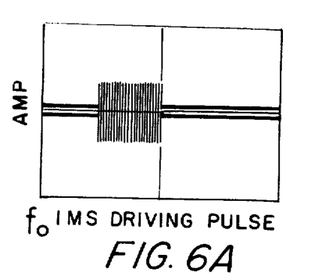
FIG. 6A-6G shows the waveforms resulting from the operation of the filter bank shown in FIG. 3.
Figure 6B:
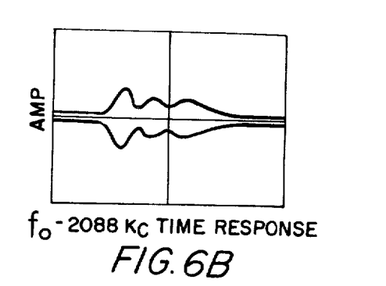
Figure 6C:
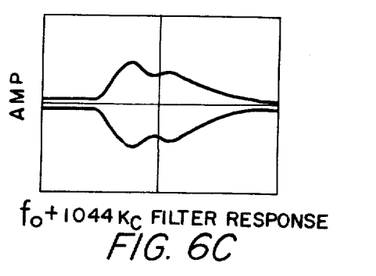
Figure 6D:
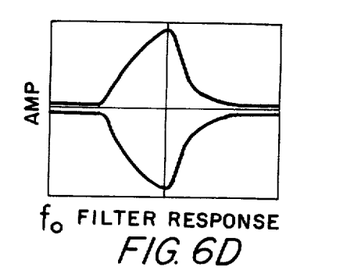
Figure 6E:
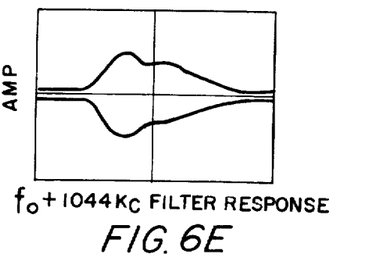
Figure 6F:
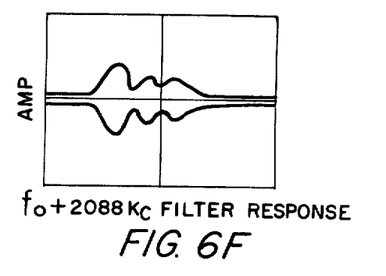

A 1-msec pulse of a single frequency is shown in FIGS. 6A–G with the outputs of five adjacent filters, one at the specific frequency $f_o$ and the two closest 1044 and 2088 KC at higher and lower frequencies. These displays are of amplitude against time. FIG. 6A shows the 1-msec driving pulse of the high-frequency compressed signals. The time constant of the center filter's response to the input pulse is clearly visible in FIG. 6D, and the similar, though more complex, responses of the side filters are also apparent in FIGS. 6B, C, E and F. These side filters produce outputs because the fast rise and fall of the single-frequency input signal create many other frequency components. As the filters are sampled in sequence while the 1-msec pulse is applied to their inputs, their outputs appear as pulses as shown in the amplitude versus frequency plot in FIG. 6G.

Figure 6G:
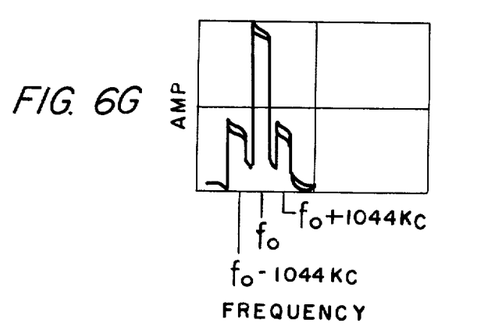

The total frequency content of the signal follows the curve $y = (\sin x)/x$, which resembles a damped sine wave. The duration of the input pulse determines the spacing between the local maxima of this curve; for a 1 msec pulse, the peaks are 1 khz apart, very nearly the same as the spacing of the various filters center frequencies. This accounts for the outputs of the side filters. These outputs drop off rapidly, however, mostly because of the decreasing amplitude of the successive peaks in the (sine $x)/x$ curve.

When the filter outputs are sampled in sequence at 1 $\mu$sec intervals, the response takes the form shown in FIG. 6G. Although side lobes are still present, the input is essentially continuous when compared to the sweep frequency. The outputs of the filters adjacent (+ and − 1044 KC) to the center filter are strongly attenuated, and the outputs of the next two are barely visible in this display. Other filters further removed from the main frequency produce no visible output at all. It should be pointed out that if digital filters were employed in the filter bank 140, the output digital-to-analog conversion performed by converter 131 would be unnecessary.

Channel Multiplexer

In the prototype digital time compressor, a multiplexer such as 122 in FIG. 3 generates sample pulses at a frequency of 20 khz and distributes them in rotation to the 10 channels, so that each channel is sampled at a 2-khz rate. The system contains a 20 khz clock, a binary counter, a binary-to-decimal decoder, (not shown) and 10 analog gates to do the actual sampling. The trailing edge of each clock pulse steps the counter, whose output is decoded to open a gate for the next clock pulse and to direct that pulse to the next channel.

Figure 7:
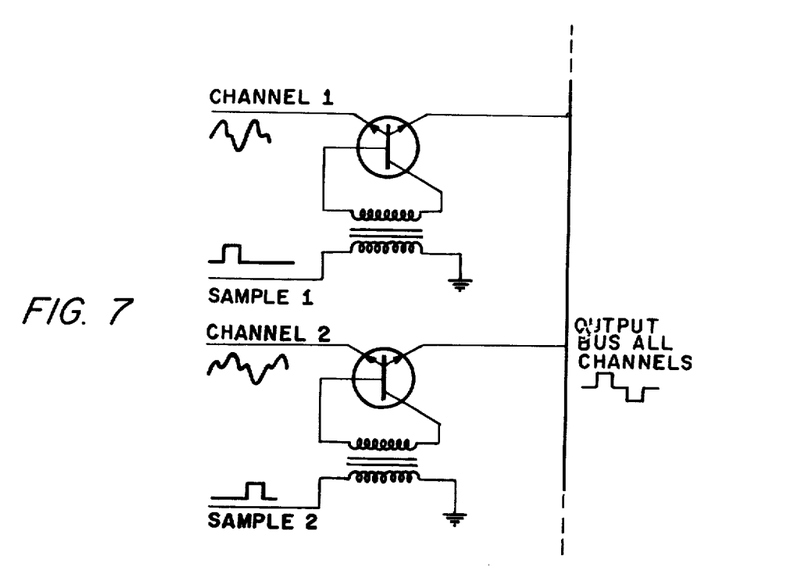
FIG. 7 shows the details of the analog gates used in the channel multiplexer shown in FIG. 3.

The analog gates shown in FIG. 7, which are similar to transistor chopper circuits, each contain a dual-emitter transistor 150 having emitter 151 and 152 with a transformer 153 connected to its base 154 and collector 155. A sample line 156 connects the transformer primary winding 157 to the decoder output. When a positive pulse appears on line 156, both emitters 151 and 152 are forward baised and the transistor 150 admits the level of the analog voltage to the common output line 158 with hardly any change.

Time compression can do as much for radar signal processing as time sharing has done for computerized airline reservation systems or bank bookkeeping. With this new technique, a single radar system can track several targets at once or search a wide expanse of sky.

Although primarily developed for large radar networks, the approach could be applied wherever a multiplicity of analog signals has to be analyzed and correlated. For example, the signals from many electrocardiograms, blood-pressure sensors, and other biomedical devices could be processed together in the same unit. The more channels there are to be monitored, the more advantages time compression offers, and these advantages can be realized without inordinately complex hardware.

The primary feature of adding noise permits separation with one bit quantization. One bit quantization permits much more efficient operation and provides much higher compression ratios.

I claim:

1. In combination:
a plurality of signal channels;
each of said channels being fed from a different source of substantially coherent information signals;
a source of substantially random noise signals having a frequency spectrum predominantly outside the spectrums of informational signals in said channels;
signal summing means fed by each of said informational signal channels and said random noise signals for adding said noise signals respectively to the signals in each of said channels;
means for sequentially sampling the output of each of said channels of said summing means at a rate substantially higher than the highest frequency of said information signals and the predominant portion of the spectrum of said noise signals;
means for storing digital data signals derived from the output of said sampling means in a storing sequence and for reading said data from said storing means in a reading sequence;
said storing sequence being different from said reading sequence; and
means for deriving at least coherent components of said information signals from said data read from said storing means.

2. The combination in accordance with claim 1 wherein the average magnitude of said noise signals is substantially greater than the average magnitude of said information signals at the input to said sampling means.

3. The combination in accordance with claim 1 wherein said frequency spectrum of said information signals is substantially wider than said frequency spectrum of said noise signals.

4. The combination in accordance with claim 1 wherein said storing means comprises means for storing the output of said sampling means as digital signals which vary as a function of the polarity of said summed signals.

5. The combination in accordance with claim 4 wherein the source of information signals comprises a plurality of channels simultaneously supplied with received signals from an echo ranging system.

6. The combination in accordance with claim 5 wherein said information signals are derived at least in part from the phase of the energy transmitted by said echo ranging system and the phase of the reflected energy received by said echo ranging system.

7. In combination:
a plurality of information signal channels;
a source of noise signals which is substantially random with respect to said information signals in said channels;
means for combining noise derived from said source of noise signals with the information signals in each of said channels;
means for sequentially sampling each of said channels at a rate substantially above the frequency spectrum of said information signals and for storing a component of said signals in said sampling sequence; and
means for deriving said information from said combined signals comprising means for reading said stored components of said signals in a different sequence from said storing sequence.

8. The combination in accordance with claim 7 wherein the major portion of said noise lies in a different portion of the frequency spectrum from said information signals.

9. The combination in accordance with claim 8 wherein the average magnitude of said noise is substantially greater than the average magnitude of said information signals in said combined signals.

10. The combination in accordance with claim 7 wherein said noise lies in a portion of said frequency spectrum above said information signals.

11. The combination in accordance with claim 10 wherein the average magnitude of said noise in said combined signals is substantially greater than the average magnitude of said information signals.

12. The combination in accordance with claim 11 wherein said combining means is a summer for adding said noise to said information signals.

13. The combination in accordance with claim 12 wherein said deriving means comprises means for periodically sampling said combined signals to provide output digital signals which vary as a function of the amplitude and/or polarity of said combined signals.

14. The combination in accordance with claim 13 wherein said source of signals comprises an echo ranging system.

15. The combination in accordance with claim 14 wherein said information signals contain information derived from the phase of the energy transmitted by said echo ranging system and the phase of the reflected energy received by said echo ranging system.

* * * * *